US010333135B2

(12) United States Patent
Paulsen et al.

(10) Patent No.: US 10,333,135 B2
(45) Date of Patent: Jun. 25, 2019

(54) CATHODE MATERIAL FOR RECHARGEABLE SOLID STATE LITHIUM ION BATTERY

(71) Applicants: Umicore, Brussels (BE); Umicore Korea Ltd., Chungnam (KR)

(72) Inventors: Jens Paulsen, Daejeon (KR); Xin Xia, Cheonan (KR); Song-Yi Han, Daejeon (KR); Jing Zhang, Cheonan (KR)

(73) Assignees: UMICORE, Brussels (BE); UMICORE KOREA LTD., Chungnam (KR)

( * ) Notice: Subject to any disclaimer, the term of this patent is extended or adjusted under 35 U.S.C. 154(b) by 21 days.

(21) Appl. No.: 15/746,113

(22) PCT Filed: Jul. 7, 2016

(86) PCT No.: PCT/IB2016/054062
§ 371 (c)(1),
(2) Date: Jan. 19, 2018

(87) PCT Pub. No.: WO2017/013520
PCT Pub. Date: Jan. 26, 2017

(65) Prior Publication Data
US 2018/0226631 A1 Aug. 9, 2018

Related U.S. Application Data

(60) Provisional application No. 62/195,388, filed on Jul. 22, 2015.

(30) Foreign Application Priority Data

Oct. 26, 2015 (EP) ..................................... 15191375

(51) Int. Cl.
*C01G 51/00* (2006.01)
*C01G 53/00* (2006.01)
(Continued)

(52) U.S. Cl.
CPC ............ *H01M 4/131* (2013.01); *C01G 51/42* (2013.01); *C01G 53/50* (2013.01);
(Continued)

(58) Field of Classification Search
CPC .... H01M 4/0471; H01M 4/131; H01M 4/366; H01M 4/505; H01M 4/525;
(Continued)

(56) References Cited

U.S. PATENT DOCUMENTS 7,993,782 B2   8/2011 Takada
2007/0122705 A1   5/2007 Paulsen et al.
(Continued)

FOREIGN PATENT DOCUMENTS

WO   20150045921   4/2015
WO   20150050031   9/2015

OTHER PUBLICATIONS

Hou, Peiyu, et el., "Design, synthesis, and performances of double-shelled LiNi0.5Co0.2Mn0.3O2 as cathode for long-life and safe Li-ion battery", Journal of Power Sources, vol. 265, May 2, 2014.
(Continued)

*Primary Examiner* — Brittany L Raymond
(74) *Attorney, Agent, or Firm* — NK Patent Law

(57) ABSTRACT

A lithium transition metal oxide powder for a positive electrode material in a solid-state lithium ion battery, the powder consisting of particles having a core and a surface layer consisting of an inner and an outer layer, wherein the powder has a D50 between 35 and 60 μm, wherein the core has the general formula $Li_xCoO_2$ with $0.99<x<1.04$ and wherein the inner surface layer comprises $Li_yNi_{1-a-b}Mn_aCo_bO_2$, with $0<y<1$, $0.3<a<0.8$ and $0<b<0.3$; and wherein the outer surface layer consists of discrete monolithic submicron sized particles having the general formula $Li_{1+z}$
(Continued)

$(Ni_{1-m-n}Mn_mCo_n)_{1-z}O_2$, with $0 \leq z \leq 0.05$, $0 < m \leq 0.50$ and $0 < n \leq 0.70$, preferably $0 < n \leq 0.30.10$

13 Claims, 3 Drawing Sheets

(51) Int. Cl.
*H01M 4/04* (2006.01)
*H01M 4/131* (2010.01)
*H01M 4/36* (2006.01)
*H01M 4/505* (2010.01)
*H01M 4/525* (2010.01)
*H01M 10/0525* (2010.01)
*H01M 10/0562* (2010.01)

(52) U.S. Cl.
CPC ......... *H01M 4/0471* (2013.01); *H01M 4/366* (2013.01); *H01M 4/505* (2013.01); *H01M 4/525* (2013.01); *C01P 2002/50* (2013.01); *C01P 2004/03* (2013.01); *C01P 2004/51* (2013.01); *C01P 2004/62* (2013.01); *C01P 2004/64* (2013.01); *C01P 2004/84* (2013.01); *C01P 2006/12* (2013.01); *C01P 2006/40* (2013.01); *H01M 10/0525* (2013.01); *H01M 10/0562* (2013.01)

(58) Field of Classification Search
CPC ......... H01M 10/0525; H01M 10/0562; C01G 51/42; C01G 53/50; C01P 2002/50; C01P 2004/03; C01P 2004/51; C01P 2004/62; C01P 2004/64; C01P 2004/84; C01P 2006/12; C01P 2006/40
See application file for complete search history.

(56) References Cited

U.S. PATENT DOCUMENTS

| | | |
|---|---|---|
| 2007/0218363 A1 | 9/2007 | Paulsen et al. |
| 2010/0187471 A1 | 7/2010 | Paulsen |
| 2010/0264363 A1 | 10/2010 | Paulsen |
| 2012/0134914 A1 | 5/2012 | Paulsen et al. |
| 2014/0045067 A1 | 2/2014 | Cho |
| 2014/0212759 A1 | 7/2014 | Blangero |
| 2014/0353548 A1 | 12/2014 | Paulsen et al. |
| 2015/0090928 A1 | 4/2015 | Paulsen et al. |
| 2015/0180026 A1 | 6/2015 | Shimokita |

OTHER PUBLICATIONS

Jang, Young-II, "High-Voltage Cycling Behavior of Thin-Film LiCoO2 Cathodes", Journal of the Electrochemical Society, 149 (11), A1442-A1447, 2002.

Okamoto, Hidetake, "Upper Voltage and Temperature Dependencies for an All-Solid-State In / LiCoO2 Cell Using Sulfide Glass Electrolyte", Electrochemical and Solid-State Letters, 11 (6), A97-A100, 2008.

Mizuno, Fuminori, "New Highly Ion-Conductive Crystals Precipitated from Li2S-PaS5 Glasses", Advanced Material, 17, 918, 2005.

EPO Search Report for PCT/IB2016/054062, dated Feb. 2, 2016.

Taiwan IPO Search Report for Taiwan Inventions Patent Application 105121918, dated Feb. 13, 2017.

International Search Report for PCT/IB2016/054062, dated Oct. 18, 2016.

1 μm

1μm　　　　　　　　1μm
(a)　　　　　　　　(b)

CATHODE MATERIAL FOR RECHARGEABLE SOLID STATE LITHIUM ION BATTERY

This application is a National Stage application of International Application No. PCT/IB2016/054062, filed Jul. 7, 2016. This application also claims priority to U.S. Application No. 62/195,388, filed Jul. 22, 2015, and European Application No. EP15191375.3, filed Oct. 26, 2015.

TECHNICAL FIELD AND BACKGROUND

This invention relates to surface-modified $LiCoO_2$ powders, applicable as positive electrode for a rechargeable solid state lithium ion battery. The cathode material improves the battery performance, such as the rate capability.

Secondary lithium ion batteries are currently the technology of choice, especially for portable applications like mobile devices and notebooks, due to their advantage of high voltage, high volumetric and gravimetric energy density, and long cycle life. However, the high cell voltage of a Li ion battery poses the problem of electrolyte instability since, at high voltages, an aqueous electrolyte will decompose. The alternative organic solvents containing supporting salts are flammable and cause safety issues in the Li ion battery. Especially, with the gradually increasing demand of large-size Li ion batteries, large amounts of combustible electrolyte are required and applied in the devices. This leads to a serious safety issue, such as high potentiality of leaking, overheating and burning. Thus, a solid state electrolyte is expected to be a solution to this problem, due to its non-flammability.

Starting from the middle of the $20^{th}$ century, the demand for higher safety has boosted the development of solid state lithium ion batteries. The use of a solid electrolyte cannot only solve the safety concerns by its non-flammability, but also provide the possibility to achieve a higher energy density and excellent cyclability. Solid electrolyte has the property of "single-ion" conduction. Typical liquid electrolytes are binary conductors having anodic and cathodic ionic conductivity which causes unwanted effects, for example electrolyte salt depletion. Thus single ion electrolytes in principle can show a superior sustainable power. Additionally a solid/solid interface can be less reactive compared to a liquid electrolyte/cathode interface. This reduces side reactions happening between liquid electrolyte and electrode materials, further preventing the decomposition of electrolyte and finally improving battery life. The advantage of less side reactions also allows the application of solid state lithium ion batteries at high voltage. In "Journal of the Electrochemical Society, 149 (11), A1442-A1447, 2002", the use of Lithium phosphorous oxy-nitride "LiPON" electrolytes (with the composition $Li_xPO_yN_z$, where $x=2y+3z-5$) assists cathode material of $LiCoO_2$ (further referred to as LCO) to achieve a high capacity of 170 mAh/g at 4.4V. In "Electrochemical and Solid-State Letters, 11 (6), A97-A100, 2008", a high capacity at elevated voltage is achieved with the assistance of $0.01Li_3PO_4$-$0.63Li_2S$-$0.36SiS_2$ sulfide glass electrolytes. The combination of high voltage cathode material and solid electrolyte is expected to be useful in applications requiring a high energy density. Besides, the use of solid electrolytes can simplify the battery structure and reduce the number of safeguards in the battery design, which lower the energy density when using liquid electrolyte.

Despite its promising characteristics there are still big limitations to a practical application, the biggest disadvantage of solid-state lithium ion batteries being the low power density. This is considered to be caused by the low ionic conductivity of solid electrolytes, as well as a large charge transfer resistance between solid electrolytes and cathode materials. Currently, many published studies have attempted to improve the bulk conductive properties of various solid electrolytes, like glass electrolyte and polymer electrolyte. Polymer electrolytes are flexible and easy for making close contact between electrolyte and electrodes, but their ionic conductivity and transport number of lithium ions are not satisfying. Glass electrolytes have a relatively high ionic conductivity. $Li_2S$—$P_2S_5$ glass ceramic was proposed as one of the most promising solid electrolyte systems in "Advanced Material, 17, 918, 2015". This literature indicated $70Li_2S$-$30P_2S_5$ showing a good stability against both electrodes at high voltage, and having a high conductivity of $3.2 \times 10^{-3}$ S/cm, which is greater by three orders of magnitude than the conventional Lipon thin film solid electrolyte. However, a drawback has still remained hidden, which is that the power densities of solid-state lithium batteries are not comparable with that of organic-solvent liquid electrolytes, in spite of the high ionic conductivities. To further solve this issue, the charge-transfer resistance at the electrode/electrolyte interface has to be considered, especially for the cathode/electrolyte interface. This parameter is essential to fabricate high power density batteries, because the rate of charge transfer at the electrode/electrolyte interface directly relates to the battery performance. A few investigations have focused on this topic.

Most of the prior art tried to reduce the charge-transfer resistance at the positive electrode/solid electrolyte interface by providing a buffer or contacting layer on top of the positive electrode. In WO2015-050031 A1, a layer of Li ion conductive oxide is coated on the cathode, particularly $LiNbO_3$, $LiBO_2$, etc. In WO2015-045921 A1, an active substance layer is applied on the surface of the positive electrode, which comprises positive active material, solid electrolyte and a conduction auxiliary agent. U.S. Pat. No. 7,993,782 B2 disclosed a layer comprising Li ion conductive titanium oxide interposed between cathode material and sulfide electrolyte, to avoid the formation of a high resistance layer at a potential of 4V or more. The above prior art presents the advantage of reducing the interfacial charge transfer resistance, which may lead to improved power performance in solid state batteries, but this has not been proved in their publications.

The charge-transfer resistance at the cathode/electrolyte interface can be decreased not only by adding a conductive surface layer, but also by increasing the contacting area between cathode and electrolyte, which can be understood as requiring a high specific surface area for the cathode particles and a close contact between cathode particle and electrolyte. Normally, a high specific surface area is achieved by providing small particles or porous big particles. But in the case of solid state lithium ion batteries, a small particle size of cathode material would result in a low packing density, which further cuts down the energy density; combined with the consumption of large amounts of electrolyte, which may raise the cost. The use of big porous particles makes it difficult to avoid inner pores, which may result in a poor contact with the electrolyte. Thus, it is necessary to provide a new model of particle morphology of cathode material to increase the specific surface area and finally satisfy the power demand of solid state lithium ion batteries. This is also the target of this invention.

More specifically, this invention aims to develop a cathode material having a large bulk particle size and high BET, which provides excellent power performance when applied in solid state lithium ion batteries.

SUMMARY

Viewed from a first aspect, the invention can provide the following product embodiments:

Embodiment 1

A lithium transition metal oxide powder for a positive electrode material in a solid-state lithium ion battery, the powder consisting of particles having a core and a surface layer consisting of an inner and an outer layer, wherein the powder has a D50 between 35 and 60 μm, wherein the core has the general formula $Li_xCoO_2$ with $0.99<x<1.04$, and wherein the inner surface layer comprises $Li_yNi_{1-a-b}Mn_aCo_bO_2$, with $0<y<1$, $0.3<a<0.8$ and $0<b<0.3$; and wherein the outer surface layer consists of discrete monolithic sub-micron sized particles having the general formula $Li_{1+z}(Ni_{1-m-n}Mn_mCo_n)_{1-z}O_2$, with $0 \leq z \leq 0.05$, $0<m \leq 0.50$ and $0<n \leq 0.70$. Here it may also be that $0<n \leq 0.30$, since Co is a costly metal.

Embodiment 2

The lithium transition metal oxide powder, wherein $0.20<y<0.60$, $0.45<a<0.60$ and $0.05 \leq b \leq 0.15$.

Embodiment 3

The lithium transition metal oxide powder, wherein $0<z<0.03$, $0.25 \leq m \leq 0.35$ and $0.15 \leq n \leq 0.25$.

Embodiment 4

The lithium transition metal oxide powder may have a BET value that is at least twice the BET value of the core material before the application of the surface layer.

Embodiment 5

The lithium transition metal oxide powder of embodiment 4, having a BET value of at least 0.20 m²/g.

Embodiment 6

The lithium transition metal oxide powder, wherein the core may further comprise up to 5 mole % of a dopant A, with A being either one or more elements of the group consisting of Al, Mg, Ti, Cr, V, Fe and Ga.

Embodiment 7

The lithium transition metal oxide powder, wherein the surface layer may further comprise up to 5 mole % of a dopant A', with A' being either one or more elements of the group consisting of A, F, S, N, Ca, Sr, Y, La, Ce and Zr, with A being either one or more elements of the group consisting of Al, Mg, Ti, Cr, V, Fe and Ga.

Embodiment 8

The lithium transition metal oxide powder, wherein the inner surface layer may consist of a multitude of islands densely sintered to the core material, the islands being Mn and Ni rich islands have a thickness of at least 100 nm and covering less than 70% of the surface of the core. Preferably the Mn and Ni rich islands bearing core comprises at least 10 mole % of both Ni and Mn. Each of the individual product embodiments described hereabove can be combined with one or more of the product embodiments described before it.

Viewed from a second aspect, the invention can provide the following method embodiments:

Embodiment 9

A method for preparing the lithium transition metal oxide powder according to the invention, comprising the steps of:
providing a first mixture of lithium carbonate and $Co_3O_4$, with a molar ratio of Li:Co between 1.07:1 and 1.12:1,
firing the first mixture at a temperature between 950 and 1050° C., for 8 to 24 hours under air, thereby obtaining a core material having a D50 value between 35 and 60 μm,
providing a second mixture of the core material and either a first Li—Ni—Mn—Co-oxide, or a set of a Ni—Mn—Co precursor powder and a Li-precursor compound,
sintering the second mixture at a temperature of at least 900° C. for 1 to 48 hrs,
providing a second lithium nickel-manganese-cobalt oxide powder having the general formula $Li_{1+z}(Ni_{1-m-n}Mn_mCo_n)_{1-z}O_2$, with $0 \leq z \leq 0.05$, $0<m \leq 0.40$ and $0<n \leq 0.30$,
reducing the D50 value of the second lithium nickel-manganese-cobalt oxide powder below 1 μm, and
mixing the second lithium nickel-manganese-cobalt oxide powder with the sintered second mixture, and heating the obtained (third) mixture at a temperature between 750 and 850° C. for 3 to 10 hours. When the first mixture is fired at temperatures of 1000° C. or more, a loss of Li of 2-4% is to be expected. The PSD of the particles that constitute the outer surface layer can be influenced by the process conditions, where the desired increase of the BET value is the essential feature. The method could also be applied to core materials having the general formula $Li_{1+z'}(Ni_{1-m'-n'}Mn_{m'}Co_{n'})_{1-z'}O_2$, with $0 \leq z' \leq 0.05$, $0<m' \leq 0.50$ and $0<n' \leq 0.70$, preferably $0<n' \leq 0.30$.

Embodiment 10

The method wherein the sintered first mixture consists of Mn and Ni bearing $LiCoO_2$ particles, said particles having Mn and Ni enriched islands on their surface, said islands comprising at least 5 mole % of Mn.

Embodiment 11

The method wherein the D50 value of the second lithium nickel-manganese-cobalt oxide powder is reduced to a value between 100 and 200 nm.

Embodiment 12

The method according wherein the quantity of second lithium nickel-manganese-cobalt oxide powder is between 3 and 10 wt % of the sintered second mixture.

Viewed from a third aspect, the invention can provide a rechargeable solid-state lithium ion battery comprising the lithium transition metal oxide powder of the invention. The solid-state battery may comprise lithium phosphorous oxynitride electrolytes, or sulfide glass system electrolyte with the general formula a"Li$_3$PO$_4$-b"Li$_2$S-c"SiS$_2$, with a"+b"+ c"=1, or Li$_S$S—P$_2$S$_5$ glass ceramics.

DETAILED DESCRIPTION

Figure 1:
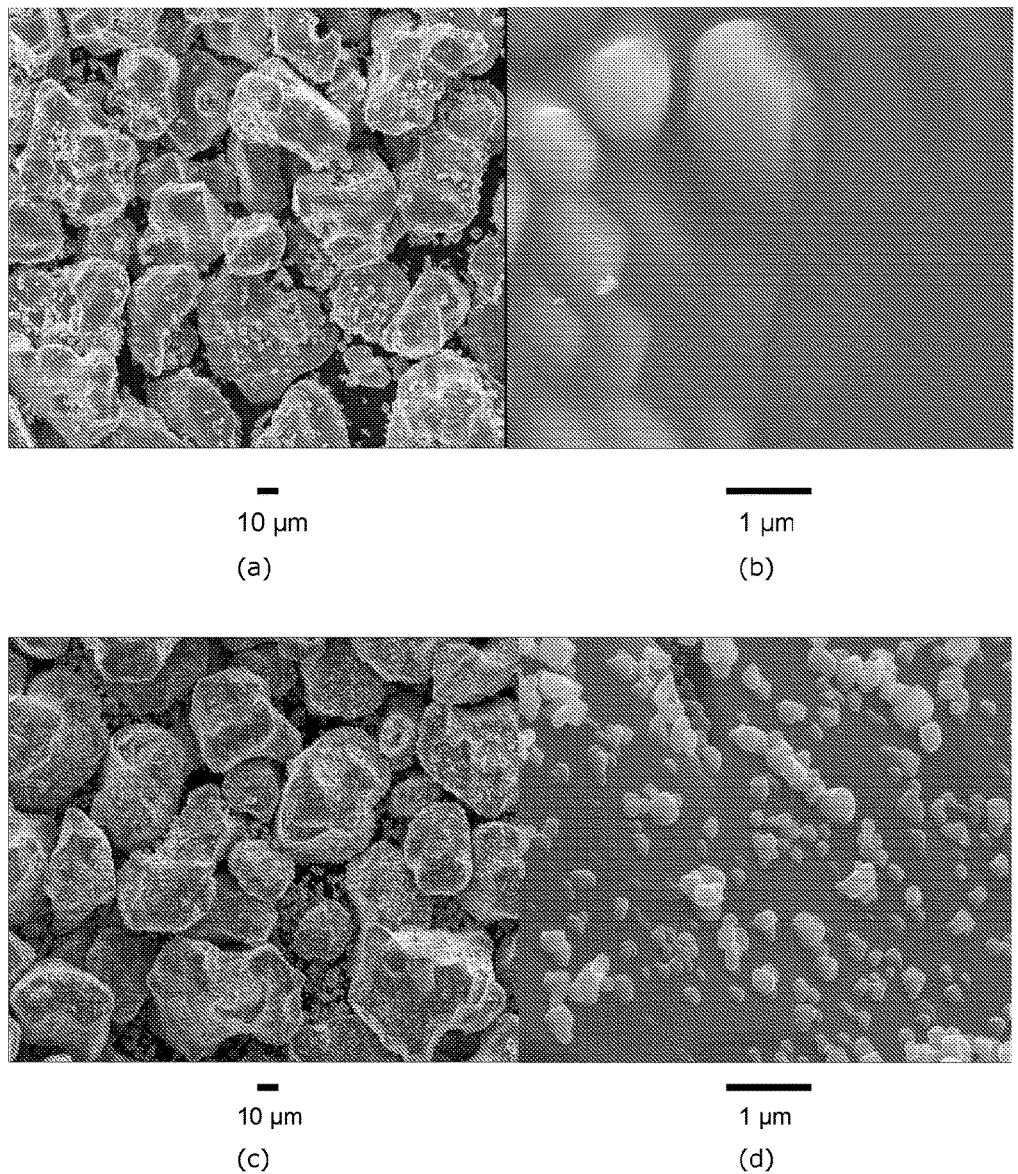
FIG. 1: SEM images of Cex1 ((a) and (b)) and Ex1 ((c) and (d))

This invention discloses a cathode powder for solid state batteries. The bulk of the cathode particles is dense and has a high ionic conductivity, thus the bulk of the cathode contributes to the transport of Li across the electrode. There is less requirement for the electrolyte itself to transport lithium and a higher power can be achieved. The larger the particles, the more transport will be facilitated by the cathode. Large dense particles naturally have a small surface area, and the charge transfer of Li ions between electrolyte and cathode will occur across this surface. However, in solid state batteries the charge transfer reaction often is slow and rate-limited. The charge-transfer resistance will be less if the surface area is increased. There are many different morphologies which create an increased surface area.

Most desired is a morphology which increases the surface area but still allows for a relatively straight conduction path of lithium into the inner of the particle. Desired are "structured" morphologies resembling that of tire profiles, studs, mountain-valleys, mushrooms etc. Less desired are porous shells and spikes because the Li diffusion paths into the interior of the particle are too long, or because there is poor or only partial contact between the electrolyte and the cathode surface.

In the following LCO stands for Li$_x$CoO$_2$ and NMC stands for Li$_{1+z}$(Ni$_r$Mn$_s$Co$_t$)$_{1-z}$O$_2$, with r+s+t=1. This invention provides nickel-manganese-cobalt-coated lithium cobalt oxide powders having a large bulk particle size and a high BET (Brunauer-Emmett-Teller) value, which is induced by the surface modification through the coating with small NMC particles. The large bulk particle size is believed to provide close contact with the solid state electrolyte, without consuming too much of the electrolyte when the powder is applied as cathode material in the rechargeable solid-state lithium ion battery. The good ionic conductivity of bulk particles and high specific surface area provide an excellent power property that is required and desired in solid state batteries. Therefore, this cathode material is promising for the application of rechargeable solid-state lithium ion battery.

This invention discloses NMC-coated LiCoO$_2$ powders consisting of a core and a (double) surface layer, where the core has the general formula of Li$_x$CoO$_2$, 0.99<x<1.04; where the surface layer consists of an inner and an outer layer, the inner layer having the formula Li$_y$Ni$_{1-a-b}$Mn$_a$Co$_b$O$_2$, with 0<y<1, 0.3<a<0.8 and 0<b<0.3, provided by coating the core with NMC-precursors, followed by firing, and where the outer layer comprises monolithic—massive, solid and uniform—sub-micron sized lithium nickel-manganese-cobalt oxide powder (having a D50<1 µm), forming the outer surface layer and being dispersed on top of the inner surface layer. The powder according to the invention is thus a monolithic NMC-coated and surface-modified LCO. The outer surface layer is believed to play an important role to increase the specific surface area of the powders of the invention, which is reflected in the high BET value. In an embodiment, the outer layer is a coating with 5 wt % of monolithic Li$_{1.02}$(Ni$_{0.50}$Mn$_{0.30}$Co$_{0.20}$)$_{0.98}$O$_2$ powder, which has a particle size expressed by the D50 value close to 200 nm (between 150 and 250 nm) or even close to 100 nm (for example between 75 and 125 nm). The BET value of the obtained powder is twice the value of an LCO sample without such coating. The increased BET can reduce the charge transfer resistance and further result in an improved power performance.

In an embodiment, coin cells based on cathode materials with higher BET value show a much greater remaining capacity at high current rate. Thus, the outer layer coating with sub-micron sized NMC is beneficial to improve the rate capability.

The authors believe that a large particle size of the cathode material is a prerequisite to solid state cells, which can reduce the consumption of electrolyte and have a good electrical contact with electrolyte particles. However, the large particles of cathode material lead to long diffusion paths for the lithium ions, which may result in poor rate performance. Thus, it is inevitable to make a compromise between size and power, which is highly related to the composition, which includes the Li:Co ratio of the core compound. In the case of LCO powder, the particle size is mainly determined by the sintering temperature and the Li:Co ratio. Higher temperatures and a greater ratio are favorable for larger particle sizes. In an embodiment, the sintering temperature is set as 1000° C. and the Li:Co ratio is chosen as 1.09:1 to guarantee a mean particle size of around 50 µm. A dry coating followed by a heat treatment by NMC-precursors is applied to correct the Li:M (M=metal) ratio close to 1:1, thereby optimizing the rate performance. As an example, if the 1$^{st}$ powder has a composition Li$_{1.05}$CoO$_{2+x}$ and we add 0.05 mole MO$_x$ (M=transition metal like Ni$_{0.5}$Mn$_{0.5}$) then we obtain a stoichiometric Li:M=1:1 compound LiCoO$_2$-LiMO$_2$. The amount of NMC-precursor is controlled to optimize the power and to avoid too much decomposition of large particles. If too much NMC-precursor is used, too many lithium ions from the LCO core-particles may diffuse to form lithiated nickel-manganese-cobalt oxide particles, so that the LCO structures may be crushed and large monolithic LCO particles may be decomposed. On the other hand, if the Li:Co ratio is too high the rate performance deteriorates.

In an embodiment, for the inner surface layer, 5 mole % of NMC precursor is applied to coat the core obtained from firing particles having the formula Li$_{1.09}$CoO$_2$. During heat treatment Co diffuses into the Li-Me-oxide (Me=Ni—Mn—Co) particles and Ni and Mn can diffuse into the core. As a result the core is still mainly LiCoO$_2$ but some doping can happen. Particularly it is possible that a minor doping of the core with Ni and Mn further increases the high ionic conductivity of the core.

As a result of the NMC coating and sintering, a high power cathode material is obtained which consists of a core and provides the inner surface of the final cathode material.

The authors observe that in the coating step of the outer surface layer, the size of monolithic NMC powders and sintering temperature are appropriate parameters to determine the morphology of the final coated product. NMC powders have to be small enough to get them uniformly dispersed on the (outer) surface of the cores.

The temperature of sintering NMC powders on the pristine or coated LCO cores has to be optimized. If the temperature is too high, there would be too much diffusion of NMC particles into the cores; if the temperature is too low, the NMC particles cannot attach to the surface. The following gives detailed description of analysis method.

PSD Test

The median particle size (D50) of the precursor compound is preferably obtained by a laser particle size distribution measurement method. In this description, the laser volumetric particle size distribution is measured using a Malvern Mastersizer 2000 with Hydro 2000MU wet dispersion accessory, after dispersing the powder in an aqueous medium. In order to improve the dispersion of the powder in the aqueous medium, sufficient ultrasonic irradiation, typically 1 minute for an ultrasonic displacement of 12, and stirring, are applied and an appropriate surfactant is introduced. The span is (D90-D10)/D50.

SEM Test

In this invention, the morphology of powders is analyzed by scanning electron microscopy. This measurement is conducted by JEOL JSM 7100F scanning electron microscope equipment under vacuum of $9.6 \times 10^{-5}$ Pa at 25° C. The images of the sample with various magnifications are taken to reveal the sample morphology and microstructure.

BET Test

The specific surface area is measured with the Brunauer-Emmett-Teller (BET) method using a Micromeritics Tristar 3000. The material is degassed in vacuum at 300° C. for 1 hour prior to the measurement, in order to remove adsorbed species.

Simulated Solid State Coin Cell Preparation

In order to simulate the performance of cathode material according to the invention in a solid state battery, a layer of polyvinylidene fluoride (PVDF, KF polymer L #9305, Kureha America Inc.) is coated on the surface of the cathode material followed by a heat treatment. During the heat treatment the PVDF decomposes and forms an inorganic film of LiF. We use this LiF film to model the solid electrolyte (or buffering layer+electrolyte) of the solid-state battery. The following steps describe the coating and electrode making process: 0.3 wt % PVDF is blended with cathode material for 5 hours by a dry mixing process and then fired at 375° C. for 5 hours under atmosphere. The calcined product is used to prepare a positive electrode in a coin cell. 99 wt % of the prepared PVDF coated active materials and 1 wt % conductive carbon black (Super P, Erachem Comilog Inc.) are intimately grinded in a mortar for 5 mins. 500 mg of mixture is then pelletized under 5N for 1 min. The obtained pellet serves as positive electrode in the coin cells, that are prepared to measure the electrochemical properties of the cathodes prepared by a standard coating process. These measurements confirm that the cathode material of this invention—despite having very large dense particles—has an excellent rate power performance. The coin cells are prepared to be tested under conditions which are more relevant for solid state battery operation.

The coin cells are prepared as follows: the positive electrode is put in an argon-filled glove box and assembled within a 2325-type coin cell body. The anode is a lithium foil having a thickness of 500 micrometers (origin: Hosen); the separator is a Tonen 20MMS microporous polyethylene film. The coin cell is filled with a few drops of a 1M solution of $LiPF_6$ dissolved in a mixture of ethylene carbonate and dimethyl carbonate in a 1:2 volume ratio (origin: Techno Semichem Co.).

Coin Cell Test

In this invention, the coin cells are cycled at 25° C. using Toscat-3100 computer-controlled galvanostatic cycling stations (from Toyo). The simulated solid state coin cell testing schedule used to evaluate Ex1 and Cex1 (see below) is detailed in Table 1. The schedules use a 1 C current definition of 160 mA/g and comprise three parts:

(i) Part I is the evaluation of rate performance at 0.1 C, 1 C, 2 C and 3 C in the 4.3~3.0V/Li metal window range. With the exception of the 1$^{st}$ cycle where the initial charge capacity CQ1 and discharge capacity DQ1 are measured in constant current mode (CC), all subsequent cycles feature a constant current-constant voltage during the charge with an end current criterion of 0.05 C. A rest time of 30 minutes for the first cycle and 10 minutes for all subsequent cycles is allowed between each charge and discharge. The irreversible capacity Qirr. is expressed in % as:

$$Q_{Irr.} = \frac{(CQ1 - DQ1)}{CQ1} \times 100(\%)$$

The rate performance at 1 C, 2 C and 3 C is expressed as the ratio between the retained discharge capacity DQn, with n=2, 3 and 4 for respectively nC=1 C, 2 C and 3 C as follows:

$$nC - \text{rate} = \frac{DQn}{DQ1} \times 100(\%)$$

For example, $$3C - \text{rate(in \%)} = \frac{DQ6}{DQ1} \times 100$$

(ii) Part II is the evaluation of cycle life at 1 C. The charge cutoff voltage is set as 4.5V/Li metal. The discharge capacity at 4.5V/Li metal is measured at 0.1 C at cycle 5 (DQ5) and 1 C at cycle 6. Capacity fadings at 0.1 C and 1 C are calculated as follows and are expressed in % per 100 cycles:

$$0.1C \ QFad. = \left(1 - \frac{DQ32}{DQ5}\right) \times \frac{1000}{27} \text{in \%/100 cycles}$$

$$1C \ QFad. = \left(1 - \frac{DQ33}{DQ6}\right) \times \frac{1000}{27} \text{in \%/100 cycles}$$

Energy fadings at 0.1 C and 1 C are calculated as follows and are expressed in % per 100 cycles. $\overline{Vn}$ is the average voltage at cycle n.

$$0.1C \ EFad. = \left(1 - \frac{DQ32 \times \overline{V32}}{DQ5 \times \overline{V5}}\right) \times \frac{1000}{27} \text{in \%/100 cycles}$$

$$1C \ EFad. = \left(1 - \frac{DQ33 \times \overline{V33}}{DQ6 \times \overline{V6}}\right) \times \frac{1000}{27} \text{in \%/100 cycles}$$

(iii) Part III is an accelerated cycle life experiment using 1 C-rate for the charge and 1 C rate for the discharge between 4.5 and 3.0V/Li metal. Capacity and energy fading are calculated as follows:

$$1C/1C \ QFad. = \left(1 - \frac{DQ58}{DQ34}\right) \times \frac{1000}{24} \text{in \%/100 cycles}$$

$$1C/1C \ EFad. = \left(1 - \frac{DQ58 \times \overline{V58}}{DQ34 \times \overline{V34}}\right) \times \frac{1000}{24} \text{in \%/100 cycles}$$

TABLE 1

Schedule of simulated solid state coin cell test

| | | Charge | | | | Discharge | | | |
| --- | --- | --- | --- | --- | --- | --- | --- | --- | --- |
| Type | Cycle No | C Rate | End current | Rest (min) | V/Li metal (V) | C Rate | End current | Rest (min) | V/Li metal (V) |
| Part I: Rate performance | 1 | 0.10 | — | 30 | 4.3 | 0.10 | — | 30 | 3.0 |
| | 2 | 0.25 | 0.05 C | 10 | 4.3 | 1.00 | — | 10 | 3.0 |
| | 3 | 0.25 | 0.05 C | 10 | 4.3 | 2.00 | — | 10 | 3.0 |
| | 4 | 0.25 | 0.05 C | 10 | 4.3 | 3.00 | — | 10 | 3.0 |
| Part II: 1 C cycle life | 5 | 0.25 | 0.1 C | 10 | 4.5 | 0.10 | — | 10 | 3.0 |
| | 6 | 0.25 | 0.1 C | 10 | 4.5 | 1.00 | — | 10 | 3.0 |
| | 7~31 | 0.50 | 0.1 C | 10 | 4.5 | 1.00 | — | 10 | 3.0 |
| | 32 | 0.25 | 0.1 C | 10 | 4.5 | 0.10 | — | 10 | 3.0 |
| | 33 | 0.25 | 0.1 C | 10 | 4.5 | 1.00 | — | 10 | 3.0 |
| Part III: 1 C/1 C cycle life | 34~58 | 1.00 | — | 10 | 4.5 | 1.00 | — | 10 | 3.0 |

1 C = 160 mA/g

Cex1 is also measured with a normal coin cell testing schedule which is detailed in Table 2. This test aims to evaluate the power performance of non-aqueous liquid electrolyte cells. The rate capability is calculated following the same procedure as described in "Coin cell test-(i) Part I". The normal coin cell is prepared following the description in "Simulated solid state coin cell preparation", but the positive electrode is prepared through a different process: An NMP (% N-methyl-2-pyrrolidone from Sigma-Aldrich) based slurry containing 83.3 wt. % of active cathode material, 8.3 wt. % polyvinylidene fluoride polymer (KF polymer L #9305, Kureha America Inc.), and 8.3 wt % of conductive carbon black (Super P, Erachem Comilog Inc.) (wt %=solid content) is prepared by intimately mixing at high speed the solids into the NMP homogenizers. The slurry is then spread in a thin layer (typically about 100 micrometer thick) on an aluminum foil by a tape-casting method. After evaporating the NMP solvent, the cast film is processed through a roll-press using a 15 micrometer gap. The active material loading is small (about 3.5 g/cm$^2$) to limit lithium plating/stripping effects and thus allowing testing at high discharge rates. Electrodes are punched from the film using a circular die cutter measuring 14 mm in diameter. The electrodes are then dried overnight at 90° C. and ready to be assembled in a coin cell.

TABLE 2

Schedule of normal coin cell test

| | | Charge | | | | Discharge | | |
| --- | --- | --- | --- | --- | --- | --- | --- | --- |
| Cycle No | C Rate | End current | Rest (min) | V/Li metal (V) | C Rate | End current | Rest (min) | V/Li metal (V) |
| 1 | 0.10 | 0.05 C | 10 | 4.4 | 0.10 | — | 10 | 3.0 |
| 2 | 0.2 | 0.05 C | 10 | 4.4 | 1 | — | 10 | 3.0 |
| 3 | 0.2 | 0.05 C | 10 | 4.4 | 5 | — | 10 | 3.0 |
| 4 | 0.2 | 0.05 C | 10 | 4.4 | 10 | — | 10 | 3.0 |
| 5 | 0.2 | 0.05 C | 10 | 4.4 | 15 | — | 10 | 3.0 |
| 6 | 0.2 | 0.05 C | 10 | 4.4 | 20 | — | 10 | 3.0 |

The invention is further illustrated in the following examples:

Example 1

This example presents NMC coated LCO powders consisting of large size coated cores of $Li_{1.09}CoO_2$ and small size surface particles of NMC 532 according to the invention. The detailed preparation procedure is described below:

(1) Preparing large particle size $Li_{1.09}CoO_2$: Lithium carbonate and cobalt oxide ($Co_3O_4$) are homogenously blended by a dry powder mixing process, following the molar ratio of Li:Co 1.09:1. After blending, the mixtures are fired at 1000° C. for 12 hours in a box furnace under air atmosphere. The sintered product is milled in a grinding machine and sieved to a particle size distribution with a D50 of around 50 μm, and a span of around 1. The sieved powders are named P1.

(2) 1$^{st}$ dry coating with NMC particles: NMC-precursors with the formula of $Ni_{0.55}Mn_{0.30}Co_{0.15}OOH$ are mixed with P1 in a tubular mixing machine in a dry powder mixing process. The molar ratio of NMC to P1 is set at 1:20. After mixing, mixtures are sintered at 1000° C. for 12 hours under air atmosphere. The sintered product is milled in a coffee machine for 30 seconds to eliminate agglomerates.

(3) Preparing small particle size of NMC 532: A premixed Ni—Mn—Co carbonate with a molar ratio of Ni:Mn:Co as 0.5:0.3:0.2 is blended with lithium carbonate in a tubular mixing machine by a dry powder mixing process. The molar ratio of lithium source to metal precursor is 1.02:1. After mixing, the mixtures are sintered at 850° C. for 10 hours under dry air. The fired powders are post-treated in a grinding machine to obtain nanosized powders. This final NMC powder is named P2.

(4) 2$^{nd}$ dry coating with P2: 5 wt % of P2 from step (3) is homogeneously mixed with powders from step (2) by a dry powder mixing process. After mixing, the mixtures are sintered at 800° C. for 5 hours under 10 L/min of dry air flow. The sintered product is then post-treated in a grinding machine to eliminate agglomerates. This final coated sample is named Ex1.

Counter Example 1

This example uses $LiCoO_2$-based powder obtained from step (2) in Example 1, and is labelled Cex1.

Discussion of Example 1 and Counter Example 1

Figure 2:
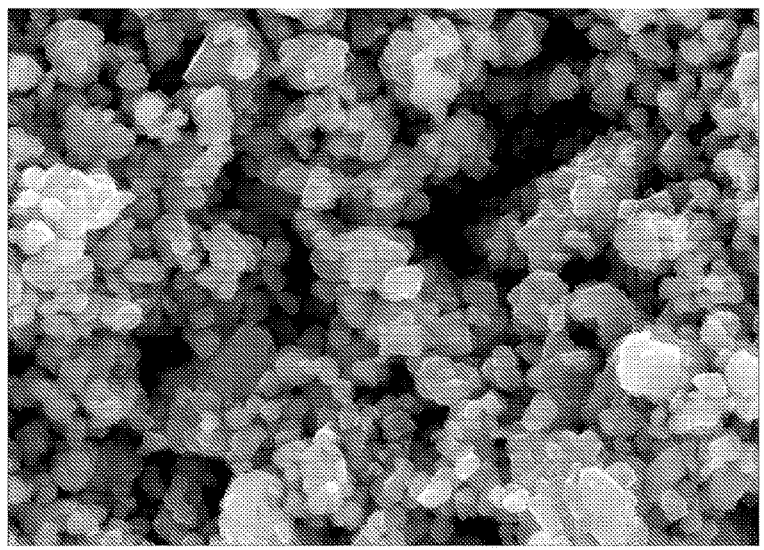
FIG. 2: SEM image of NMC powder

Table 3 lists D50 and BET of P1 from the first preparation step of Example 1 (large particle size $Li_{1.09}CoO_2$), Cex1 and Ex1. Comparing the D50 of these three samples, there is a small decrease of particle size from P1 to CEx1, which indicates that the 1st coating with $Ni_{0.55}Mn_{0.3}Co_{0.15}OOH$ succeeds to correct the Li:M ratio without crushing or decomposing the large particle. The same phenomenon is observed in the $2^{nd}$ coating with sub-micron sized monolithic NMC powders. This coating step provides the positive effect of creating a structured surface, thus increasing the BET. Table 3 shows that Ex1 has a BET value that is twice the value of Cex1. SEM images (a) and (b) in FIG. 1 show the morphology of Cex1 (with different magnification), while (c) and (d) present Ex1. Image (b) clearly shows the coating of small particles of NMC from step (2) in the description of Example 1. Compared to image (b), there are more small particles on the surface in image (d)—which are NMC powders from step (3) of Example 1, and the size of these small particles is around 200 nm. The SEM image of these NMC powders (P2) is presented in FIG. 2. The coating of these nanoparticles leads to the improvement of the BET of Ex1. Furthermore, the larger value of BET may result in a better power performance of Ex1.

TABLE 3

Physical properties of Ex1.

| Sample ID | D50 (μm) | BET (m²/g) |
| --- | --- | --- |
| Ex1 | 43.95 | 0.29 |
| CEx1 | 47.52 | 0.14 |
| P1 | 49.09 | — |

Figure 3:
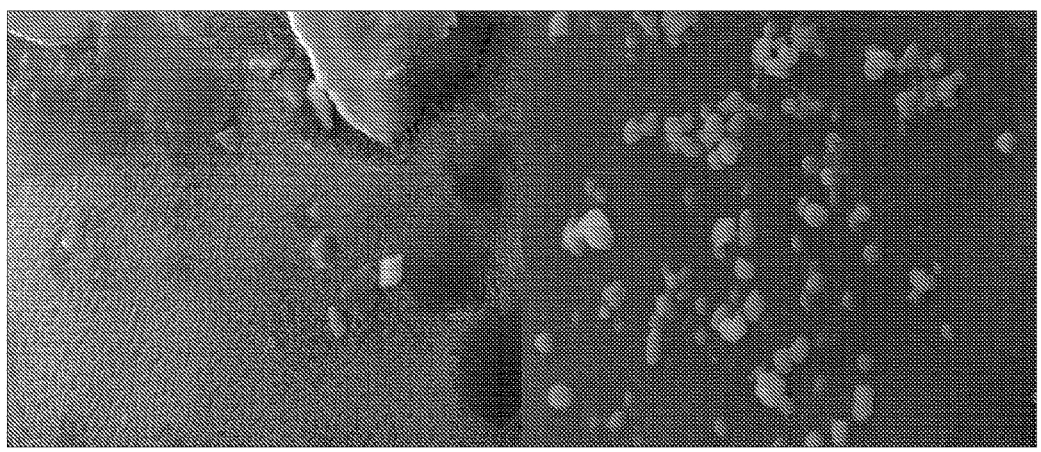
FIG. 3: SEM images of PVDF-modified Cex1 (a) and Ex1(b)

FIG. 3 shows the SEM images of the cathode materials obtained by the PVDF coating route described above. Image (a) presents the surface morphology of PVDF coated Cex1 and image (b) belongs to PVDF coated Ex1. In the pictures, a scale-like coating layer is shown on the surface of bulk materials, which is believed to be the layer of PVDF used for the simulation of the solid-state coin cells. Table 4 summarizes the charge capacity, discharge capacity and irreversible capacity percentage during the first cycle, which is cycled at 3.0 to 4.3V, and the discharge capacity cycled at the range of 3.0 to 4.5V, as well as rate capability at 1 C, 2 C and 3 C, for Ex1 and Cex1. Compared with Cex1, the retaining capacities at different current rates of Ex1 are all higher, especially at high rates like 3 C, where the improvement is more obvious, which confirms the contribution of the high BET value of Ex1. Ex1 has also good capacity properties. In Table 4, CQ1, DQ1 and DQ5 of Ex1 are greater than the values of Cex1, while Qirr of Ex1 is smaller than that of Cex1, which indicates that the coating with sub-micron NMC 532 particles may also contribute to enhance the capacities.

TABLE 4

Rate capability of Ex1 and Cex1 in simulated solid state coin cell

| Sample ID | CQ1 (mAh/g) | DQ1 (mAh/g) | Qirr (%) | DQ5 (mAh/g) | Rate (%) | | |
| --- | --- | --- | --- | --- | --- | --- | --- |
| | | | | | 1 C | 2 C | 3 C |
| Ex1 | 163.14 | 156.43 | 4.11 | 187.93 | 94.51 | 91.98 | 90.15 |
| Cex1 | 160.85 | 153.13 | 4.80 | 180.25 | 92.08 | 84.72 | 75.80 |

Figure 4:
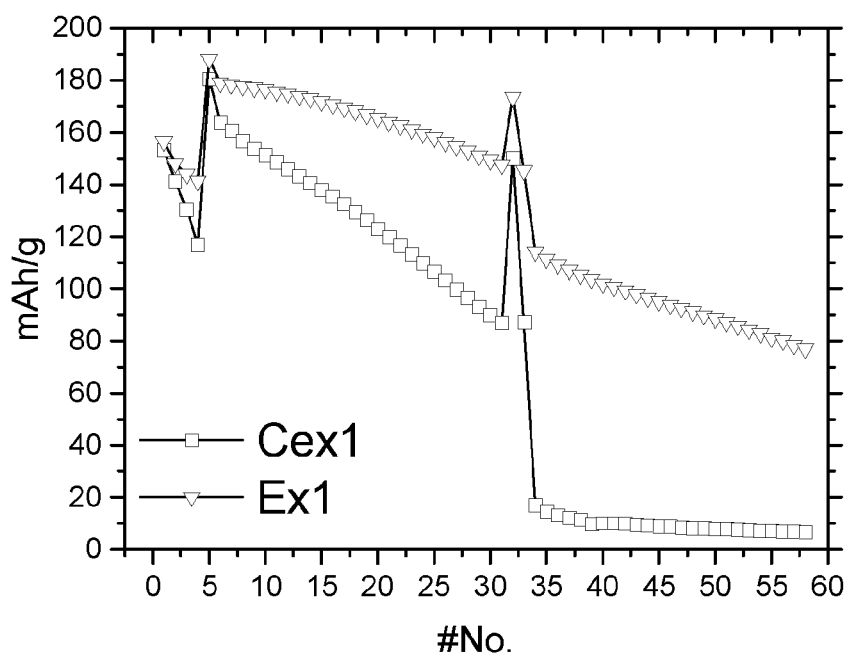
FIG. 4: Cyclability of Ex1 and Cex1

Table 5 shows the capacity and energy fading of Ex1 and Cex1 during cycling. For all the fading parameters, a coin cell based on Ex1 shows less fade when compared with Cex1, thus Ex1 has better cyclability. FIG. 4 shows the cycling behaviour of Ex1 and Cex 1.

TABLE 5

Cyclability of Ex1 and Cex1

| | Fade (%/100) | | | | | |
| --- | --- | --- | --- | --- | --- | --- |
| | 0.1 C QFad. | 1 C/1 C QFad. | 1 C/1 C QFad. | 0.1 C EFad. | 1 C/1 C EFad. | 1 C/1 C EFad. |
| Ex1 | 29.11 | 69.69 | 134.54 | 41.31 | 95.36 | 149.03 |
| Cex1 | 63.17 | 173.98 | 257.85 | 91.53 | 196.62 | 257.08 |

Table 6 lists the rate capability of Cex1 which is tested in a normal coin cell following the schedule detailed in Table 2. In Table 6, the capacity retention of Cex1 at 1 C, 5 C, 10 C, 15 C and 20 C is summarized. The discharge capacity at 0.1 C is set to 100%. The value at 1 C is about 96%. When increasing the capacity rate to 20 C, there is no big drop of capacity, even at 20 C, the capacity retention is still above 80%. Generally speaking, this rate performance is excellent and quite acceptable for high power application.

TABLE 6

Rate capability of Cex1 in non-aqueous liquid electrolyte coin cell

| Sample | Rate (%) | | | | |
| --- | --- | --- | --- | --- | --- |
| ID | 1 C | 5 C | 10 C | 15 C | 20 C |
| CEx1 | 96.01 | 90.63 | 87.34 | 84.88 | 81.98 |

According to the above discussion, Cex1, which is manufactured with only the 1st dry coating step, has good power performance, but possesses low BET and poor surface contact with solid electrolyte that is mimicked by a LiF layer in this invention. Thus, Cex1 presents non-satisfying power properties in the simulated solid state coin cell test. By coating with the 2nd layer of monolithic sub-micron sized NMC 532, sample Ex1 exhibits a higher BET, better rate capability and cyclability, compared with Cex1. The good rate performance of Ex1 is considered as a promising property for the application in a solid state battery. Thus, Ex1 can be a candidate cathode material for use in a rechargeable solid-state lithium ion battery.

The invention claimed is:
1. A lithium transition metal oxide powder for a positive electrode material in a solid-state lithium ion battery, the powder comprising particles, the particles comprising
 a core having the general formula $Li_xCoO_2$ with $0.99<x<1.04$; and
 a surface layer, the surface layer having an inner layer and an outer layer, wherein the inner surface layer comprises $Li_yNi_{1-a-b}Mn_aCo_bO_2$, with $0<y<1$, $0.3<a<0.8$ and $0<b<0.3$, and the outer surface layer comprises discrete, monolithic, sub-micron sized particles having the general formula

$$Li_{1+z}(Ni_{1-m-n}Mn_mCo_n)_{1-z}O_2,$$

with $0 \leq z \leq 0.05$, $0<m \leq 0.50$ and $0<n \leq 0.70$;
wherein the powder has a D50 between 35 and 60 μm.
2. The lithium transition metal oxide powder of claim 1, wherein $0.20<y<0.60$, $0.45<a<0.60$ and $0.05 \leq b \leq 0.15$.
3. The lithium transition metal oxide powder of claim 1, wherein $0<z<0.03$, $0.25 \leq m \leq 0.35$ and $0.15 \leq n \leq 0.25$.
4. The lithium transition metal oxide powder of claim 1, wherein the particles have a BET value that is at least twice the BET value of the core material before the application of the surface layer.

5. The lithium transition metal oxide powder of claim 4, wherein the particles have a BET value of at least 0.20 m²/g.

6. The lithium transition metal oxide powder of claim 1, wherein the core further comprises up to 5 mole % of a dopant A, with A being one or more elements selected from the group consisting of Al, Mg, Ti, Cr, V, Fe and Ga.

7. The lithium transition metal oxide powder of claim 1, wherein the surface layer further comprises up to 5 mole % of a dopant A', with A' being one or more elements selected from the group consisting of A, F, S, N, Ca, Sr, Y, La, Ce and Zr.

8. The lithium transition metal oxide powder of claim 1, wherein the inner surface layer comprises a multitude of islands densely sintered to the core material, the islands being Mn and Ni rich islands have a thickness of at least 100 nm and covering less than 70% of the surface of the core.

9. A method for preparing the lithium transition metal oxide powder of claim 1, comprising:
providing a first mixture of lithium carbonate and $Co_3O_4$, with a molar ratio of Li:Co between 1.07:1 and 1.12:1,
firing the first mixture at a temperature between 950 and 1050° C., for 8 to 24 hours under air atmosphere, thereby obtaining a core material having a D50 value between 35 and 60 μm,
providing a second mixture of the core material and either a first Li—Ni—Mn—Co-oxide, or a set of a Ni—Mn—Co precursor powder and a Li-precursor compound,
sintering the second mixture at a temperature of at least 900° C. for 1 to 48 hrs,
providing a second lithium nickel-manganese-cobalt oxide powder having the general formula $Li_{1+z}(Ni_{1-m-n}Mn_mCo_n)_{1-z}O_2$, with $0 \leq z \leq 0.05$, $0 < m \leq 0.40$ and $0 < n \leq 0.30$,
reducing the D50 value of the second lithium nickel-manganese-cobalt oxide powder below 1 μm, and
mixing the second lithium nickel-manganese-cobalt oxide powder with the sintered second mixture, and heating the obtained mixture at a temperature between 750 and 850° C. for 3 to 10 hours.

10. The method according to claim 9, wherein the sintered first mixture consists of Mn and Ni bearing $LiCoO_2$ particles, said particles having Mn and Ni enriched islands on their surface, said islands comprising at least 5 mole % of Mn.

11. The method according to claim 9, wherein the D50 value of the second lithium nickel-manganese-cobalt oxide powder is reduced to a value between 100 and 200 nm.

12. The method according to claim 9, wherein the quantity of second lithium nickel-manganese-cobalt oxide powder is between 3 and 10 wt % of the sintered second mixture.

13. A rechargeable solid-state lithium ion battery comprising the lithium transition metal oxide powder of claim 1.

* * * * *